US012098813B1

(12) United States Patent
Xie et al.

(10) Patent No.: US 12,098,813 B1
(45) Date of Patent: Sep. 24, 2024

(54) SEAMLESSLY ILLUMINATING BENDABLE LIGHT STRIP AND MANUFACTURING PROCESS THEREOF

(71) Applicant: General Lighting Electronic Co., Ltd., Zhongshan (CN)

(72) Inventors: Jiuhuai Xie, Loudi (CN); Wenguang Tang, Xiangtan (CN)

(73) Assignee: General Lighting Electronic Co., Ltd., Zhongshan (CN)

( * ) Notice: Subject to any disclaimer, the term of this patent is extended or adjusted under 35 U.S.C. 154(b) by 0 days.

(21) Appl. No.: 18/460,128

(22) Filed: Sep. 1, 2023

(30) Foreign Application Priority Data

Aug. 15, 2023 (CN) ......................... 202311027802.7

(51) Int. Cl.
*F21S 4/22* (2016.01)
*F21S 4/24* (2016.01)

(52) U.S. Cl.
CPC .. *F21S 4/22* (2016.01); *F21S 4/24* (2016.01)

(58) Field of Classification Search
CPC ................... F21S 4/00; F21S 4/22; F21S 4/24
See application file for complete search history.

(56) References Cited

U.S. PATENT DOCUMENTS 11,125,399 B1 * 9/2021 Zarcone ................ F21V 23/005
2008/0094828 A1 * 4/2008 Shao ......................... F21S 4/20 362/219

FOREIGN PATENT DOCUMENTS

CN 216431342 U * 5/2022
GB 2361988 A * 11/2001 ................ F21S 4/28

OTHER PUBLICATIONS

Innovation Q+ NPL Search (Year: 2024).*

* cited by examiner

*Primary Examiner* — Anabel Ton
(74) *Attorney, Agent, or Firm* — Birchwood IP

(57) ABSTRACT

The present invention discloses a seamlessly illuminating bendable light strip and manufacturing process thereof, comprising a strip-shaped PCB, a plurality of LED chips, and a flexible bracket; wherein the PCB is provided with a plurality of deformation portions capable of being deformed in different directions, and an arc-shaped opening is provided on the deformation portions; the plurality of the LED chips are uniformly distributed on the PCB between the two adjacent deformation portions; and the flexible bracket is a one-piece molded structure comprising a plurality of bracket units connected in sequence, and two adjacent bracket units are connected to each other by means of a flexible connecting strip, wherein the PCB is snap-fitted to the flexible bracket while the flexible connecting strip passes through the arc-shaped openings in a transverse direction.

9 Claims, 5 Drawing Sheets

SEAMLESSLY ILLUMINATING BENDABLE LIGHT STRIP AND MANUFACTURING PROCESS THEREOF

FIELD OF INVENTION

The present invention relates to the field of lighting technology, in particular to a seamlessly illuminating bendable light strip and manufacturing process thereof.

BACKGROUND OF THE INVENTION

A seamlessly illuminating light strip is generally a linear light or a wall washer. The conventional wall washer is a profile structure that cannot be effectively bent; for this reason, the existing flexible wall washer uses a bendable PCB and a bendable bracket that can fix the PCB to achieve the flexible bending. The existing bendable PCB is usually formed by making a notch on the PCB to achieve the bending, the notch can be bent to the left and right, but it is difficult to achieve the bending of the up and down direction, which may cause the PCB to be easily damaged by bending up and down; and the bendable bracket is usually formed by hinging a number of small brackets, which is a time-consuming process and does not facilitate the manufacturing; in addition, when the existing wall washers are used outdoors, they require potting for waterproofing, which is complicated and difficult to effectively control the waterproofing process.

SUMMARY OF THE INVENTION

The purpose of the present invention is to solve at least one of the technical problems existing in the prior art and to provide a seamlessly illuminating bendable light strip and a manufacturing process thereof in which the PCB is not easily damaged, is easy to manufacture, and has a simple waterproofing process.

A seamlessly illuminating bendable light strip according to an embodiment of the first aspect of the present invention, comprising: a strip-shaped PCB, a plurality of LED chips, and a flexible bracket; wherein the PCB is provided with a plurality of deformation portions capable of being deformed in different directions, and an arc-shaped opening is provided on the deformation portions; the plurality of the LED chips are uniformly distributed on the PCB between the two adjacent deformation portions; and the flexible bracket is a one-piece molded structure comprising a plurality of bracket units connected in sequence, and two adjacent bracket units are connected to each other by means of a flexible connecting strip, wherein the PCB is snap-fitted to the flexible bracket while the flexible connecting strip passes through the arc-shaped openings in a transverse direction.

According to some embodiments of the present invention, the deformation portion is a U-shaped bend.

According to some embodiments of the present invention, the arc-shaped opening is located in the middle of the deformation portion.

According to some embodiments of the present invention, the bracket unit comprises two parallel transverse struts and a plurality of longitudinal reinforcing ribs connected perpendicularly to each of the two transverse struts, wherein the flexible connecting strips are connected to each of two adjacent longitudinal reinforcing ribs corresponding to two adjacent bracket units.

According to some embodiments of the present invention, the transverse strut is provided with a resilient snap portion and the PCB is snap-fitted to the resilient snap portion such that the PCB is disposed between the resilient snap portion and the longitudinal reinforcing rib.

According to some embodiments of the present invention, the bracket unit is provided with a limit portion, a notch is provided at the edge of the PCB, and the limit portion is snap-fitted to the notch.

According to some embodiments of the present invention, the limit portion is located at the junction of the transverse strut and the longitudinal reinforcing rib.

According to some embodiments of the present invention, the flexible bracket is provided with a buckle structure at its end, and two of the flexible brackets are connected by the buckle structure.

According to some embodiments of the present invention, comprising a flexible lamp housing and a plug, wherein the flexible lamp housing is sleeved on the PCB and the flexible bracket, and the plugs are provided at each end of the flexible lamp housing.

A manufacturing process according to an embodiment of the second aspect of the present invention, which is applied to the above-described seamlessly illuminating bendable light strip, comprising: Step 1, mounting the LED chips and electronic components on the PCB; Step 2, fabricating the deformation portion on the PCB; Step 3, snap-fitting of the PCB with the flexible bracket described with the deformation portion moving closer to the flexible connecting strip so as to pass through the arc-shaped opening in a transverse direction; Step 4, wrapping the PCB and the flexible bracket in the extruded flexible lamp housing by means of one-piece extrusion to form a light strip; and Step 5, cutting the light strip to the appropriate length according to the requirement, and then waterproofing and plugging with the plug at the head and tail of the light strip.

The seamlessly illuminating bendable light strip and manufacturing process thereof according to an embodiment of the present invention have at least the following beneficial effects: since the PCB is provided with the deformation portion which can be deformed in different directions so that the PCB can be arbitrarily bent in different directions and is not easily damaged, and the plurality of bracket units through the flexible connecting strip connection makes the flexible bracket as a whole with flexible, can be multi-directional deformation to follow the PCB arbitrary multi-directional bending with excellent bending effect. In addition, the flexible connecting strip transversely passes through the arc-shaped opening of the deformation portion not only to play a role in positioning, but also to play a reinforcing role. When the flexible bracket is subjected to a bending force, each bracket unit will not be deformed or deformed small, and the deformation is mainly at the location of flexible connecting strips with arbitrary bending. The one-piece molded structure of the flexible bracket has a simple structure, which is easy to twist and saves the manufacturing process; in addition, by using the one-piece extrusion process, the waterproof effect is excellent and the process is simple.

Additional aspects and advantages of the present invention will be given, in part, as will become apparent from the following description, or as will be learned through the practice of the present invention.

BRIEF DESCRIPTION OF THE DRAWINGS

Specific embodiments of the present invention will be further described below in connection with the accompanying drawings.

DETAILED DESCRIPTION OF THE PREFERRED EMBODIMENTS

Figure 1:
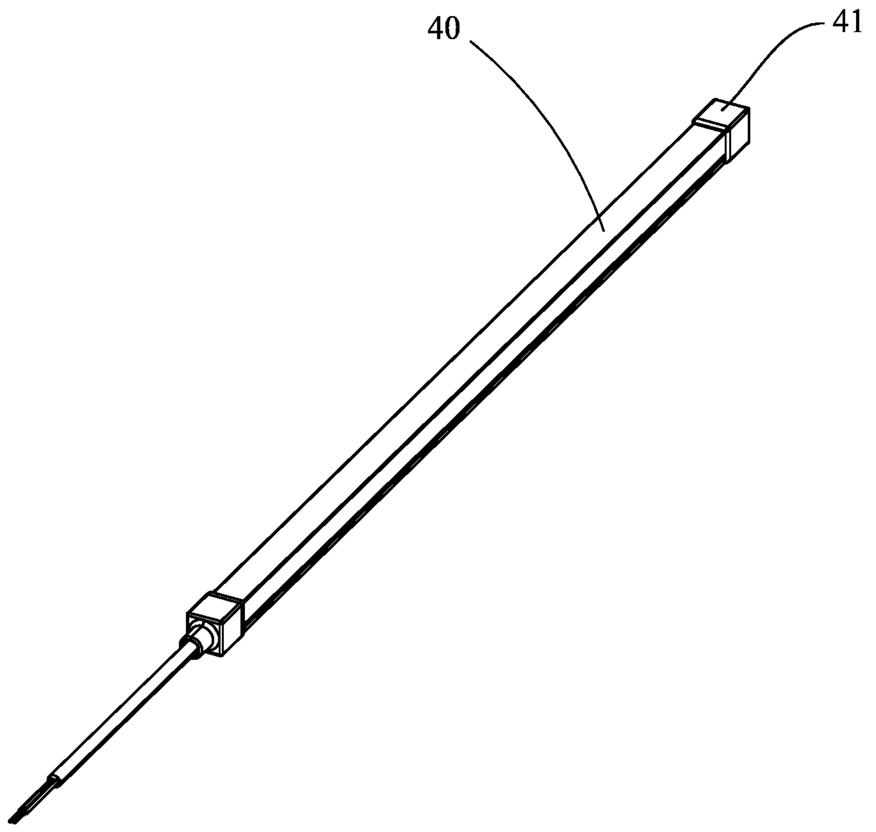
FIG. 1 is a structural diagram of a seamlessly illuminating bendable light strip.

This section will describe in detail the specific embodiments of the present invention, the preferred embodiments of the present invention are shown in the accompanying drawings, the role of the accompanying drawings is to supplement the description of the specification so that people can intuitively and graphically understand each technical feature of the present invention and the overall technical solutions, but it cannot be construed as limiting the scope of protection of the present invention.

In the description of the present invention, it should be understood that orientation descriptions such as up, down, front, rear, left, right and the like, which refer to orientation or positional relationships indicated as being based on those shown in the accompanying drawings, are intended only to facilitate the description of the present invention and to simplify the description, and do not indicate or suggest that the device or element referred to must have a particular orientation, be constructed and operated with a particular orientation, and therefore should not be construed as a limitation of the present invention.

In the description of the present invention, the meaning of a number is one or more, the meaning of a plurality is more than two, greater than, less than, more than, etc. is understood to exclude the present number, and above, below, within, etc. is understood to include the present number. If there is a description to the first, the second is used only for the purpose of distinguishing technical features and is not to be understood as indicating or implying relative importance or implicitly specifying the number of technical features indicated or implicitly specifying the sequential relationship of the technical features indicated.

Referring to FIGS. 1 to 5, a seamlessly illuminating bendable light strip of an embodiment of the present invention comprises a strip-shaped PCB 10, a plurality of LED chips 11, and a flexible bracket; wherein the PCB 10 is provided with a plurality of deformation portions 12 capable of being deformed in different directions, and an arc-shaped opening 121 is provided on the deformation portions 12; the plurality of the LED chips 11 are uniformly distributed on the PCB 10 between the two adjacent deformation portions 12, two to eight LED light chips 11, preferably five or six LED chips 11, are generally provided between two adjacent deformation portions 12; and the flexible bracket is a one-piece plastic injection molded structure comprising a plurality of bracket units 21 connected in sequence, and two adjacent bracket units 21 are connected to each other by means of a flexible connecting strip 22, wherein the PCB 10 is snap-fitted to the flexible bracket while the flexible connecting strip 22 passes through the arc-shaped openings 121 in a transverse direction. Since the PCB 10 is provided with the deformation portion 12 which can be deformed in different directions so that the PCB 10 can be arbitrarily bent in different directions and is not easily damaged, and the plurality of bracket units 21 through the flexible connecting strip 22 connection makes the flexible bracket as a whole with flexible, can be multi-directional deformation to follow the PCB 10 arbitrary multi-directional bending with excellent bending effect. In addition, the flexible connecting strip transversely passes through the arc-shaped opening of the deformation portion not only to play a role in positioning, but also to play a reinforcing role. When the flexible bracket is subjected to a bending force, each bracket unit will not be deformed or deformed small, and the deformation is mainly at the location of flexible connecting strips with arbitrary bending. The one-piece molded structure of the flexible bracket has a simple structure, which is easy to twist and saves the manufacturing process; in addition, by using the one-piece extrusion process, the waterproof effect is excellent and the process is simple.

Figure 2:
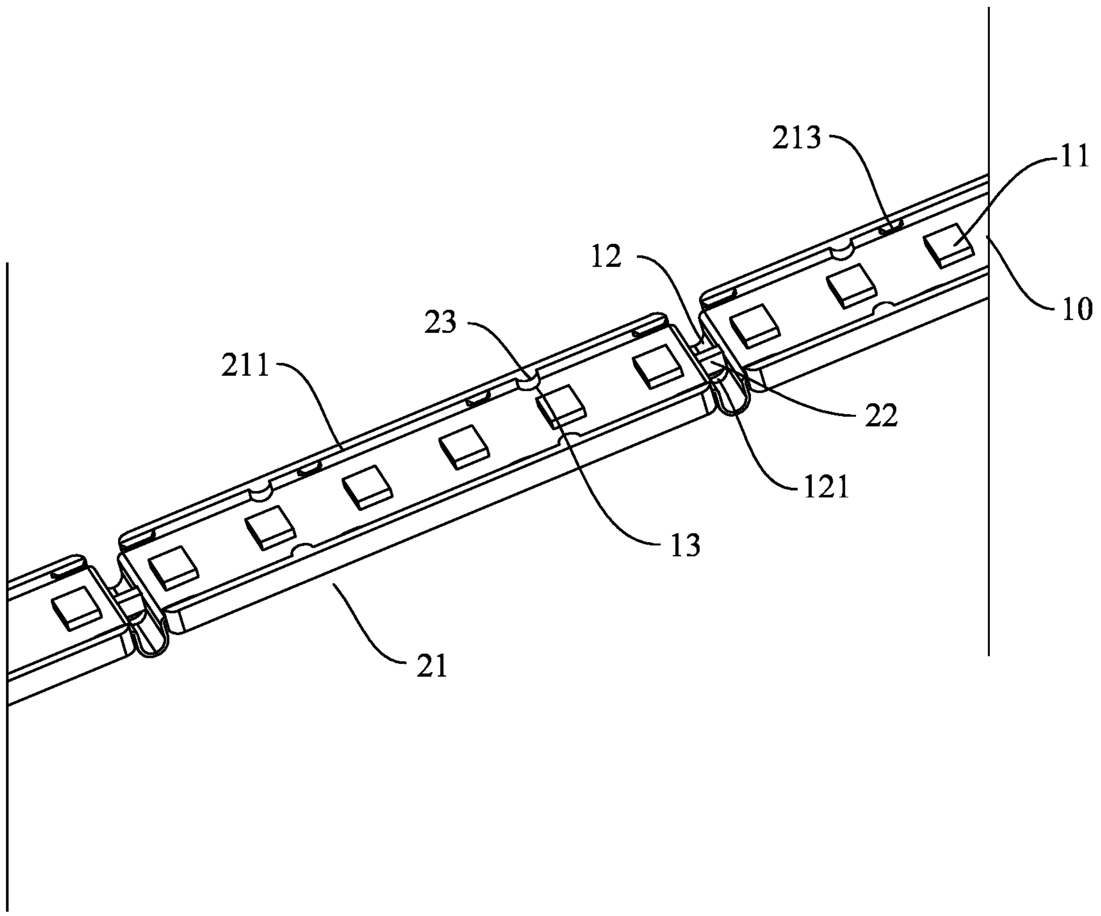
FIG. 2 is a structural diagram of the assembly of a PCB and a flexible bracket of the seamlessly illuminating bendable light strip.
Figure 3:
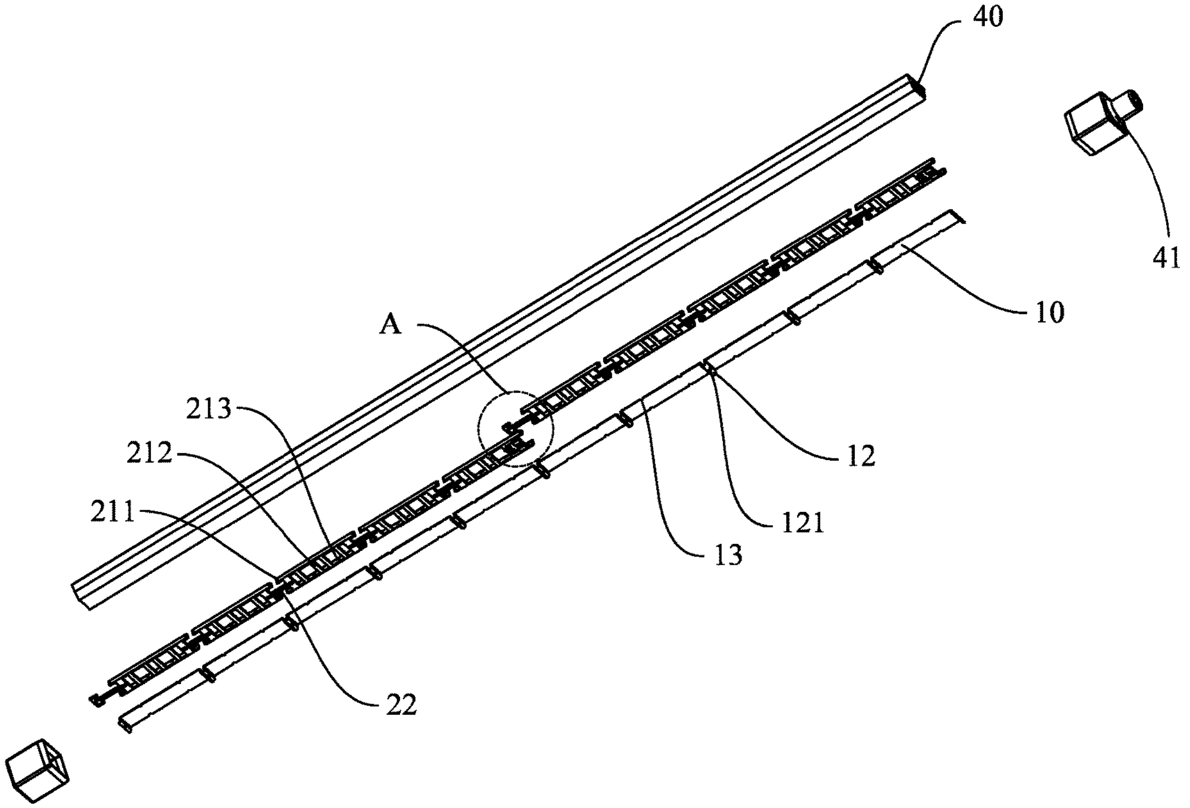
FIG. 3 is an exploded structural diagram of the seamlessly illuminating bendable light strip.

As shown in FIGS. 2 and 3, the deformation portion 12 is a U-shaped bend, the arc-shaped opening 121 is located in the middle of the deformation portion 12, and the U-shaped bend has a large deformation space, which facilitates deformation of the PCB 10 in different directions, and is not easily damaged; in some embodiments, the deformation portion 12 is a V-shaped bend, which has a larger deformation space.

Figure 4:
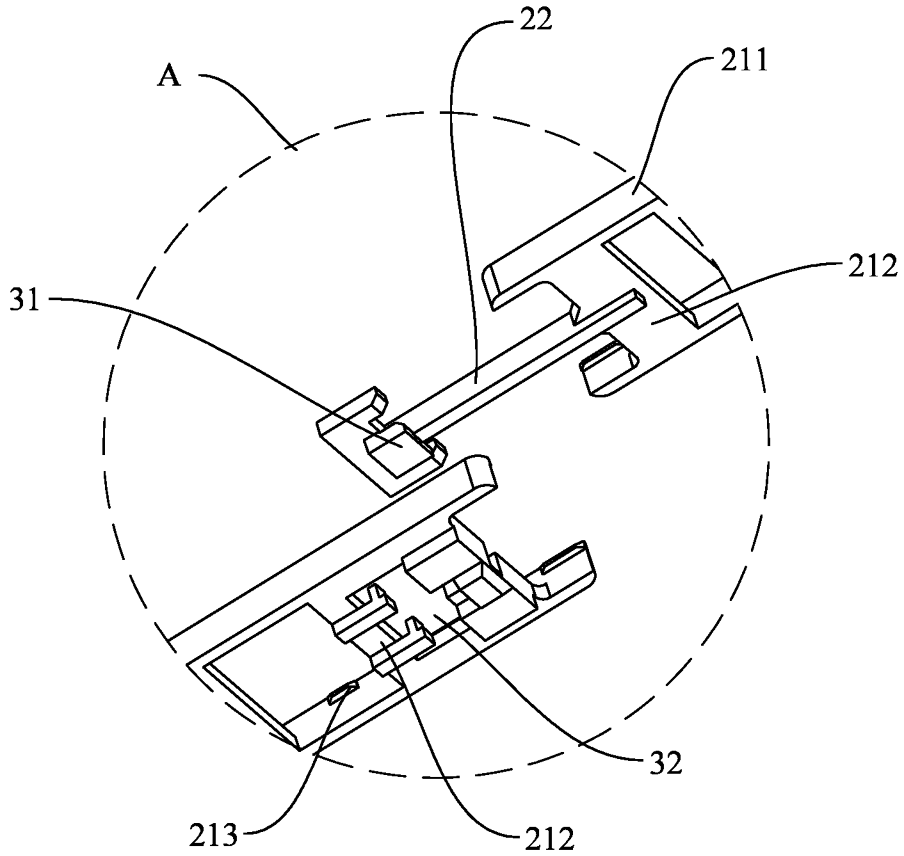
FIG. 4 is an enlarged structural diagram of part A in FIG. 3.
Figure 5:
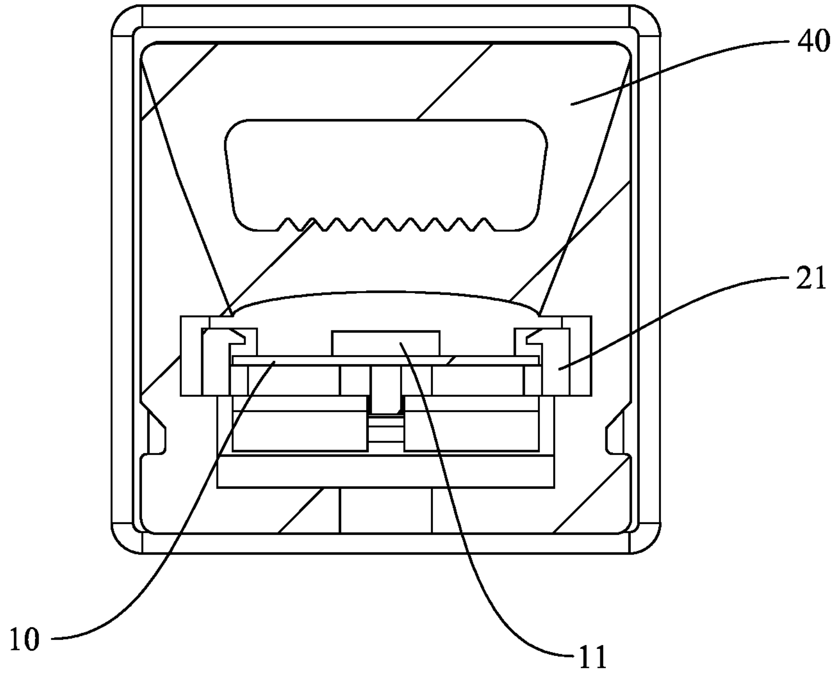
FIG. 5 is a cross-sectional view of the seamlessly illuminating bendable light strip.

As shown in FIGS. 3 and 4, the bracket unit 21 comprises two parallel transverse struts 211 and a plurality of longitudinal reinforcing ribs 212 perpendicularly connected to each of the two transverse struts 211, the number of the longitudinal reinforcing ribs 212 ranging from two to six. Preferably, when there are six LED chips 11 between two adjacent deformation portions 12, the longitudinal reinforcing ribs 212 are also six in number and are symmetrically distributed on that bracket unit 21. The flexible connecting strips 22 are connected to each of two adjacent longitudinal reinforcing ribs 212 corresponding to two adjacent bracket units 21.

As shown in FIG. 2, the transverse strut 211 is provided with a resilient snap portion 213, the PCB 10 is pressed down to be snap-fitted with the resilient snap portion 213, and the PCB 10 is disposed between the resilient snap portion 213 and the longitudinal reinforcing rib 212; the bracket unit 21 is provided with a limit portion 23 which is a limiting projection, and a notch 13 is provided at the edge of the PCB 10, the limit portion 23 being snap-fitted to the notch 13.

Preferably, the limiting projection is located at the junction of the transverse strut 211 and the longitudinal reinforcing rib 212 to connect with the transverse strut 211 and the longitudinal reinforcing rib 212, respectively, for a more robust structure.

As shown in FIG. 4, the flexible bracket is provided with a buckle structure at the end of the flexible bracket, and the two flexible brackets are connected by the buckle structure to extend the flexible bracket, wherein the buckle structure includes a buckle portion 31 and a buckle hole 32, and the two flexible brackets are a first flexible bracket and a second flexible bracket, respectively, wherein a first bracket unit 21 is disposed at the end of the first flexible bracket, and a second bracket unit 21 is disposed at the end of the second flexible bracket. The buckle hole 32 is disposed on the first bracket unit 21, the buckle portion 31 is disposed on the flexible connecting strip 22 connected to the second bracket unit 21, and the buckle hole 32 is disposed between two adjacent longitudinal reinforcing ribs 212 on the first bracket unit 21, and the buckle portion 31 is bent downward to buckle with the buckle hole 32.

As shown in FIGS. 1 and 3, comprising a flexible lamp housing 40 and a plug 41, wherein the flexible lamp housing 40 is sleeved on the PCB 10 and the flexible bracket, and the plugs 41 are provided at each end of the flexible lamp housing 40.

The manufacturing process of the present invention, as applied to the aforementioned seamlessly illuminating bendable light strip, comprises:

Step 1, mounting the LED chips (11) and electronic components on the PCB (10);

Step 2, fabricating the deformation portion (12) on the PCB (10);

Step 3, snap-fitting of the PCB (10) with the flexible bracket described with the deformation portion (12) moving closer to the flexible connecting strip (22) so as to pass through the arc-shaped opening (121) in a transverse direction;

Step 4, wrapping the PCB (10) and the flexible bracket in the extruded flexible lamp housing (40) by means of one-piece extrusion to form a light strip; and Step 5, cutting the light strip to the appropriate length according to the requirement, and then waterproofing and plugging with the plug (41) at the head and tail of the light strip.

By using the one-piece extrusion process, the waterproof effect is excellent and the process is simple.

It will readily be appreciated by those skilled in the art that the above preferred methods can be freely combined and superimposed without conflict.

The foregoing is only a preferred embodiment of the present invention and is not intended to limit the scope of the present invention, and all equivalent structural transformations made by utilizing the contents of the specification of the present invention and the accompanying drawings under the inventive concept of the present invention, or utilized directly or indirectly in other related fields of technology, are all included within the scope of the patent protection of the present invention.

What is claimed is:

1. A seamlessly illuminating bendable light strip, characterized in that it comprises:

a strip-shaped PCB (10), which is provided with a plurality of deformation portions (12) capable of being deformed in different directions, and an arc-shaped opening (121) is provided on the deformation portions (12);

a plurality of LED chips (11), which are uniformly distributed on the PCB (10) between the two adjacent deformation portions (12); and a flexible bracket which is a one-piece molded structure comprising a plurality of bracket units (21) connected in sequence, and two adjacent bracket units (21) are connected to each other by means of a flexible connecting strip (22), wherein the PCB (10) is snap-fitted to the flexible bracket while the flexible connecting strip (22) passes through the arc-shaped openings (121) in a transverse direction.

2. The seamlessly illuminating bendable light strip according to claim 1, characterized in that: the deformation portion (12) is a U-shaped bend.

3. The seamlessly illuminating bendable light strip according to claim 2, characterized in that: the arc-shaped opening (121) is located in the middle of the deformation portion (12).

4. The seamlessly illuminating bendable light strip according to claim 1, characterized in that: the bracket unit (21) comprises two parallel transverse struts (211) and a plurality of longitudinal reinforcing ribs (212) connected perpendicularly to each of the two transverse struts (211), wherein the flexible connecting strips (22) are connected to each of two adjacent longitudinal reinforcing ribs (212) corresponding to two adjacent bracket units (21).

5. The seamlessly illuminating bendable light strip according to claim 4, characterized in that: the transverse strut (211) is provided with a resilient snap portion (213) and the PCB (10) is snap-fitted to the resilient snap portion (213) such that the PCB (10) is disposed between the resilient snap portion (213) and the longitudinal reinforcing rib (212).

6. The seamlessly illuminating bendable light strip according to claim 1, characterized in that: the bracket unit (21) is provided with a limit portion (23), a notch is provided at the edge of the PCB (10), and the limit portion (23) is snap-fitted to the notch.

7. The seamlessly illuminating bendable light strip according to claim 6, characterized in that: the limit portion (23) is located at the junction of the transverse strut (211) and the longitudinal reinforcing rib (212).

8. The seamlessly illuminating bendable light strip according to claim 1, characterized in that: the flexible bracket is provided with a buckle structure at its end, and two of the flexible brackets are connected by the buckle structure.

9. The seamlessly illuminating bendable light strip according to claim 1, characterized in that: comprising a flexible lamp housing (40) and a plug (41), wherein the flexible lamp housing (40) is sleeved on the PCB (10) and the flexible bracket, and the plugs (41) are provided at each end of the flexible lamp housing (40).

* * * * *